United States Patent [19]

Ogawa et al.

[11] Patent Number: 4,649,081
[45] Date of Patent: Mar. 10, 1987

[54] MAGNETIC RECORDING MEDIUM

[75] Inventors: Hiroshi Ogawa; Shinji Saito; Chiaki Mizuno; Yasuo Tamai, all of Odawara, Japan

[73] Assignee: Fuji Photo Film Co., Ltd., Japan

[21] Appl. No.: 787,776

[22] Filed: Oct. 15, 1985

[30] Foreign Application Priority Data

Oct. 15, 1984 [JP] Japan .................. 59-216882

[51] Int. Cl.[4] ............................. G11B 5/71
[52] U.S. Cl. ......................... 428/447; 252/62.54; 427/128; 428/694; 428/695; 428/900
[58] Field of Search ............. 428/694, 695, 900, 447; 427/131, 128; 252/62.54; 360/134–136

[56] References Cited

U.S. PATENT DOCUMENTS

| | | | |
|---|---|---|---|
| 4,369,230 | 1/1983 | Kimura | 428/447 |
| 4,431,703 | 2/1984 | Somezawa | 428/695 |
| 4,469,750 | 9/1984 | Fujiki | 428/447 |
| 4,469,751 | 9/1984 | Kobayashi | 428/447 |
| 4,501,800 | 2/1985 | Fujiki | 428/447 |

Primary Examiner—Ellis P. Robinson
Attorney, Agent, or Firm—Ostrolenk, Faber, Gerb & Soffen

[57] ABSTRACT

A magnetic recording medium such as an audio-tape or a video-tape comprising a nonmagnetic support and a magnetic recording layer provided on said support, said magnetic recording layer comprising a ferromagnetic powder dispersed in a binder, which is characterized in that said magnetic recording layer comprises at least one modified silicon compound having molecular weight of less than 3,000 and at least one modified silicon compound having molecular weight of not less than 3,000.

8 Claims, 2 Drawing Figures

MAGNETIC RECORDING MEDIUM

BACKGROUND OF THE INVENTION

1. Field of the Invention

The present invention relates to a magnetic recording medium. More particularly, the invention relates to an improvement of a magnetic recording medium comprising a nonmagnetic support and a magnetic recording layer.

2. Description of Prior Arts

A magnetic recording medium basically comprises a nonmagnetic support and a magnetic recording layer provided on the support, the magnetic recording layer comprising a ferromagnetic powder dispersed in a binder.

At present, magnetic recording media are used in a variety of forms, for example, an audio-tape, a video-tape, a floppy disk and so on. Naturally, magnetic recording media are required to have various characteristics according to their forms and purposes.

The audio-tape such as an audio cassette tape is frequently used for recording music. In this case, a magnetic recording medium is required to show excellent electromagnetic conversion characteristics such as satisfactory frequency characteristics and a superb reproducibility of original sounds. Also, a tape should have an improved running property, durability and heat resistance so as to meet the outstanding needs since the magnetic tape-recording medium is now generally employed in automobiles, a cassette tape-recorder with radio and a small-sized tape player.

In the case of a video cassette tape, highly dense recording is now possible by shortening recording wavelengths or narrowing a track width. A magnetic recording medium is, therefore, required to show excellent electromagnetic conversion characteristics such as high video outputs, high S/N ratio and excellent reproducibility of originally recorded pictures. Further, the recent wide spread use of portable VTRs request a tape to have an improved running property and durability. While tapes need to be highly durable, the tape thickness tends to be thinner, for example, less than 20 µm.

Thus, a magnetic recording medium in the form of tape such as a video-tape or an audio-tape should run in contact with a fixed magnetic head, a drum, guide drums and so on. Therefore, a magnetic recording medium needs to have not only excellent electromagnetic conversion characteristics but also a low friction coefficient which enables smooth and stable running for a long period of time. Further, the tape needs to have satisfactory durability and heat resistance, because it should run under a great amount of friction with a magnetic head.

There have been several proposals to fulfill the above-mentioned requirements for the characteristics of a magnetic recording medium.

For example, it is reported that the running property of a tape is improved by incorporating into the magnetic recording layer a higher fatty acid, a higher fatty acid ester, a paraffinic hydrocarbon or a silicone oil. Thus, lubricity is imparted to the tape to prevent wear of the tape caused by the friction with the tape head, thereby improving not only the tape durability but also the magnetic conversion characteristics of a magnetic recording medium. These proposals are seen in the specifications of Japanese Patent Publications No. 41-18064, No. 43-186, No. 43-669, No. 47-15624, No. 56-20611 and No. 56-26890 and U.S. Pat. Nos. 2,654,681, 3,470,021, 3,497,411, 3,525,694, 3,634,253, 4,110,503, and 4,135,016.

The running property of a tape can be improved to a certain extent by incorporating a higher fatty acid, a higher fatty acid ester, a paraffinic hydrocarbon or a silicone oil into a magnetic recording layer. By these methods, however, the characteristics required for a magnetic recording medium, especially magnetic conversion characteristics, are hardly improved. There is also a problem that a magnetic recording medium using a fatty acid shows poor heat resistance and shrinks at elevated temperatures.

When a higher fatty acid, a higher fatty acid ester, a paraffinic hydrocarbon or a silicone oil is included in a magnetic recording layer, the phenomenon called "blooming" (the above compound oozes out from the surface of a magnetic recording layer) may sometimes take place. This blooming phenomenon makes a tape sticky and consequently reduces the running smoothness. The blooming phenomenon is especially observed in the case that a silicone oil is used. Also, a tape containing the above compound may exhibit, on the contrary to the original purpose, high coefficient of kinetic friction with a head drum under heavy load. In such instance, the abnormal sounds called "creaks" are sometimes generated by the friction between the tape and the drum. Further, the compounds oozed out through blooming are very likely to catch dusts, whereby the magnetic recording medium is contaminated.

SUMMARY OF THE INVENTION

It is a primary object of the present invention to provide an improved magnetic recording medium which is improved with respect to the above-described disadvantageous features of the conventional magnetic recording media.

The second object of the invention is to improve the running property of a magnetic recording medium, whereby magnetic conversion characteristics are then improved.

It is also an object of the present invention to provide a magnetic recording medium that has an improved heat stability as well as durability, that shows little shrinkage when it is stored at high temperatures, and further that exhibits an excellent running property upon storage at high temperatures.

There is provided by the present invention a magnetic recording medium comprising a nonmagnetic support and a magnetic recording layer provided on said support, said magnetic recording layer comprising a ferromagnetic powder dispersed in a binder, which is characterized in that said magnetic recording layer comprises at least one modified silicon compound having molecular weight of less than 3,000 and at least one modified silicon compound having molecular weight of not less than 3,000.

In the above-described magnetic recording medium, the modified silicon compound having molecular weight of less than 3,000 is a modified silicon compound having molecular weight in the range of 200 to 2,000 and the modified silicon compound having molecular weight of not less than 3,000 is a modified silicon compound of molecular weight in the range of 5,000 to 100,000.

The magnetic recording medium provided by the invention possesses prominently improved magnetic conversion characteristics. Further, the magnetic recording medium of the present invention exhibits an excellent running property and satisfactory heat resistance. The present inventive medium hardly shrinks even when it is kept at high temperatures. The physical durability is also greatly improved.

DETAILED DESCRIPTION OF THE INVENTION

Figure 1:
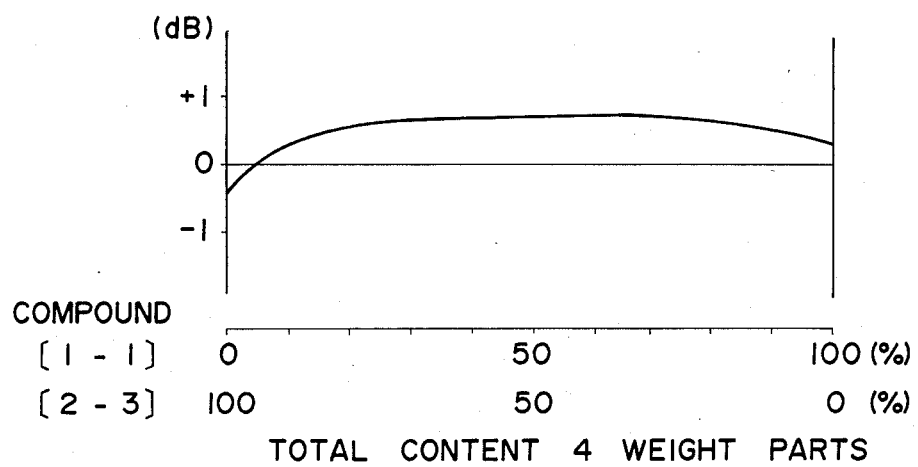
FIG. 1 is a graph showing an example of the characteristic of the output level of the magnetic recording medium of the invention at the distortion rate of 3% at 315 Hz.

A magnetic recording medium of the invention comprises a nonmagnetic support and a magnetic recording provided on the support. The magnetic recording layer comprises a ferromagnetic powder dispersed in a binder.

There is no specific restriction on the nonmagnetic support employable in the present invention, and any known nonmagnetic support can be employed.

The material of the nonmagnetic support is not particularly limited and can be selected, for example, from polyethylene terephthalate, polypropylene, polycarbonate, polyethylene naphthalate, polyamide, polyamideimide, polyimide and metallic foils such as aluminum foil and stainless steel foil. The thickness of the support film is generally in the range of 3 to 50 μm and preferably in the range of 5 to 30 μm.

The heat shrinkage ratio of the nonmagnetic support of the invention which is measured along the longitudinal direction (MD) after having been kept for 4 hours at 100° C. under application of no tension should be not higher than 1.2% and more preferably not higher than 1.0%. If the heat shrinkage ratio of the nonmagnetic support exceeds 1.2%, the heat shrinkage ratio of the produced magnetic recording medium also tends to be high, and the deformation of the magnetic recording medium caused by heat shall hinder in some cases the sufficient improvement of the magnetic conversion characteristics and running property.

In the case of a video tape, the heat shrinkage ratio measured under the above-mentioned conditions preferably is not higher than 0.7%.

The surface roughness (Ra) of the nonmagnetic support is preferably in the range of 0.1 to 0.0001 μm, more preferably in the range of 0.05 to 0.001 μm. "Ra" is a center average roughness defined in the Section 5 of JIS-B-0601, at cut-off value of 0.25 mm. If the surface roughness exceeds 0.1 μm, the produced magnetic recording medium does not have a surface of satisfactory smoothness, and the electromagnetic conversion characteristics are not sufficiently improved in some cases. On the other hand, if the surface roughness of a support is less than 0.0001 μm, the running property is not satisfactorily improved.

The nonmagnetic support may have a back layer (or backing layer) on the opposite side of the side where a magnetic recording layer is coated.

The magnetic recording medium of the invention has the above-described nonmagnetic support coated thereupon with a magnetic recording layer comprising a ferromagnetic powder dispersed in a binder. The ferromagnetic powder employable in the present invention is not particularly restricted and can be selected from, for example, $\gamma$-$Fe_2O_3$, $Fe_3O_4$, Co-modified iron oxide, alloy powder having iron atom as a major component, modified barium ferrite and modified strontium ferrite. The shape of the ferromagnetic powder normally used is needle shape, grain shape, dice shape, rice shape or plate shape. The size of ferromagnetic powder is normally not greater than 1 μm, and preferably not greater than 0.5 μm. Its specific surface area is normally from 20 $m^2/g$ to 200 $m^2/g$, preferably up to 100 $m^2/g$.

The binder employable in the present invention can be selected from any of resins which are soluble in organic solvents. Examples of the resins include cellulose derivatives (e.g., nitrocellulose, cellulose acetate), vinyl chloride/vinyl acetate copolymer resins, (e.g., vinyl chloride/vinyl acetate copolymers, vinyl chloride/vinyl acetate/vinyl alcohol copolymers, and vinyl chloride/vinyl acetate/maleic acid anhydride copolymers), vinylidene chloride resins (e.g., vinylidene chloride/vinyl chloride copolymers, vinylidene chloride/acrylonitrile copolymers), polyester resins (e.g., alkyd resin and linear polyester), acrylic resins (e.g., acrylic acid/acrylonitrile copolymer and methyl acrylate/acrylonitrile copolymer), polyvinyl acetal resin, polyvinyl resin, phenoxy resin, epoxy resin, butadiene/acrylonitrile copolymer resin, polyurethane resin and urethane epoxy resin. These resins can be used independently or in combination.

If the above-mentioned resin is used with polyisocyanate compound as a binder, the magnetic recording layer of the invention can be more hardened. The polyisocyanate compounds which can be used are, for example, adducts of 3 moles of diisocyanate and 1 mole of trimethylol propane (e.g., tolylene diisocyanate, xylilene diisocyanate, hexamethylene diisocyanate), adducts of 3 moles of hexamethylene diisocyanate and buret, isocyanurate compounds of 5 moles of tolylene diisocyanate, isocyanurate adducts of 3 moles of tolylene diisocynanate and 2 moles of hexamethylene diisocyanate and polymer compounds of diphenylmethane diisocyanate.

The amount of the binder is generally in the range of 10 to 100 parts by weight and preferably in the range of 15 to 50 parts by weight per each 100 parts by weight of the ferromagnetic powder.

It is necessary to include in the magnetic recording layer of the invention at least one modified silicon compound having molecular weight of less than 3,000 (referred to herein as low molecular weight modified silicon compound) and at least one modified silicon compound having molecular weight of not less than 3,000 (referred to herein as high molecular weight modified silicon compound). The preferred combination of the modified silicon compounds included in the magnetic recording layer of the invention is a combination of a modified silicon compound having molecular weight in the range of 200 to 2,000 and a modified silicon compound having molecular weight in the range of 5,000 to 100,000.

The low molecular weight modified silicon compounds mainly contribute to the improvement of running property under the ordinary running conditions. The high molecular weight modified silicon compounds mainly contribute to the improvement of running property after the tape is stored at high temperatures. In this manner, the running properties and heat stabilities are both improved by the incorporation of two or more kinds of modified silicon compounds having different molecular weights in a magnetic recording layer. Further, the magnetic conversion characteristics of a magnetic recording medium are greatly improved.

If the magnetic recording layer includes only the low molecular weight modified silicon compound, the magnetic recording medium does not show satisfactory heat stability and shows poor magnetic conversion characteristics especially under the circumstances of high temperature and high humidity and after the tape has been stored at high temperatures. On the other hand, if the magnetic recording layer includes only the high molecular weight modified silicon compound, the magnetic recording medium does not show satisfactory running property and magnetic conversion characteristics, and further the magnetic recording medium lacks the sufficient lubricity and shows poor durability.

The chemical structure of the modified silicon compounds employable in the present invention is not particularly limited. The modified silicon compounds can be selected from those having following chemical structures.

Modified silicon compound disclosed in Japanese Patent Publication No. 56-20611 (U.S. Pat. No. 4,110,503) having the formula (1):

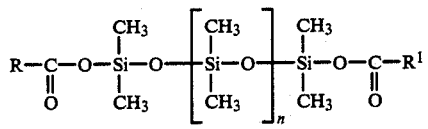

(1)

wherein each of R and $R^1$ represents a hydrocarbon group having 7 to 21 carbon atoms, and n stands for an integer of 0 to 50;

Modified silicon compound disclosed in Japanese Patent Publication No. 56-26890 (U.S. Pat. No. 4,135,016) having the formula (2):

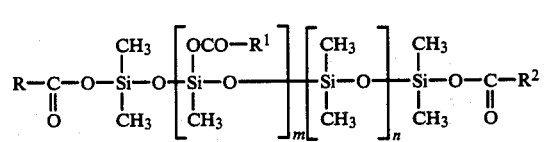

(2)

wherein each of R, $R^1$ and $R^2$ represents a hydrocarbon group having 7 to 21 carbon atoms, m is an integer of 1 to 100 and n is an integer 0 to 250 having the relationship of $m+n<300$ and $m>n/5$;

Modified silicon compound disclosed in Japanese Patent Publication No. 52-24806 having the formula (3):

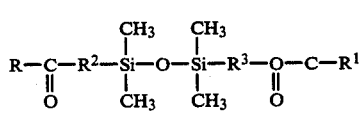

(3)

wherein each of R and $R^1$ represents either H or a hydrocarbon group having 1 to 18 carbon atoms, and each of $R^2$ and $R^3$ represents a hydrocarbon group having 2 to 17 carbons atoms;

Modified silicon compound disclosed in Japanese Patent Publication No. 52-39423 (U.S. Pat. No. 4,007,314) having the formula (4):

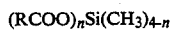

(4)

wherein R represents a hydrocarbon group having 7 to 17 carbon atomss, and n is an integer of 1 to 3;

Modified silicon compound disclosed in Japanese Patent Publication No. 52-39424 (U.S. Pat. No. 4,007,313) having the formula (5):

(5)

wherein R represents a hydrocarbon group having 7 to 17 carbon atoms, and n is an integer of 1 to 3;

Modified silicon compound disclosed in Japanese Patent Publication No. 52-28687 having the formula (6):

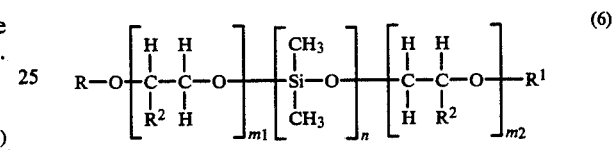

(6)

wherein each of R and $R^1$ represents either an alkyl group having 8 to 18 carbon atoms or an alkenyl group, $R^2$ represents either a hydrogen atom or a methyl group, and n, $m_1$ and $m_2$ have the relationships of $1<n<15$ and $2<m_1+m_2<16$;

Modified silicon compound disclosed in Japanese Patent Publication No. 53-10446 having the formula (7):

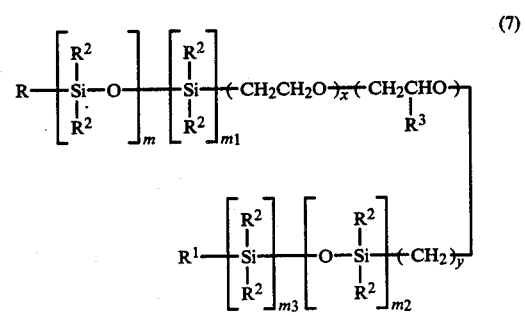

(7)

wherein R represents a hydrocarbon group having 1 to 6 carbon atoms, $R^1$ represents a hydrocarbon group having 1 to 6 carbon atoms or OH when $m_2$ and $m_3$ are both zero, $R^2$ represents a hydrocarbon group having 1 to 7 carbon atoms, $R^3$ represents either a hydrogen atom or a hydrocarbon group having 1 or 2 carbon atoms, m is an integer of 1 to 40, $m_1$ is an integer of 0 or 1, $m_2$ is an integer of 0 to 20, $m_3$ is an integer of 0 or 1 and x and y are numbers which make the sum of x and y a number in the range of 3 to 40;

Modified silicon compound having the formula (8):

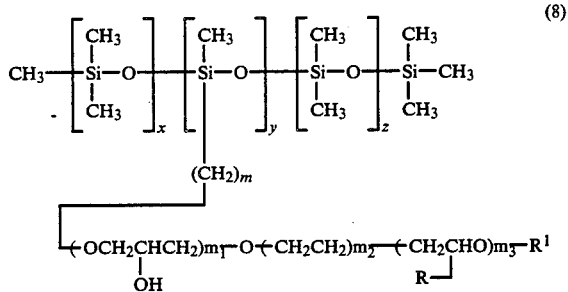

(8)

wherein R represents either a hydrogen atom or a hydrocarbon group having 1 or 2 carbon atoms, $R^1$ represents a hydrocarbon group having 1 to 7 carbon atoms, x is an integer of 1 to 50, y is an integer of 1 to 30, z is an integer of 0 to 24, m is an integer of 0 to 3, $m_1$ is either 0 or 1, and $m_2$ and $m_3$ have the relationship that their sum, $m_2+m_3$, is in the range of 3 to 30;

Modified silicon compound disclosed in Japanese Patent Publication No. 57-12414 having the formula (9):

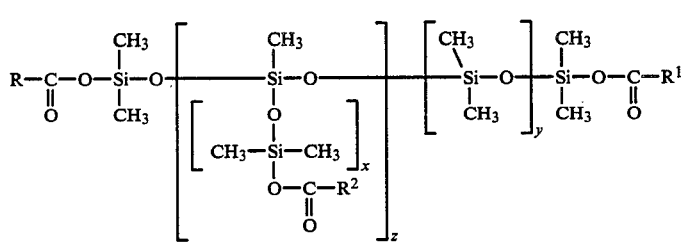

(9)

wherein each of R, $R^1$ and $R^2$ represents either a saturated or unsaturated hydrocarbon group having 7 to 21 carbon atoms, and x, y and z have the relationship of $1<z<150$, $0<y$, $y+z<1,000$, $1<x<y+z$, and $z/y=1/1000-1/1$;

Modified silicon compound disclosed in Japanese Patent Publication No. 57-12419 having the formula (10):

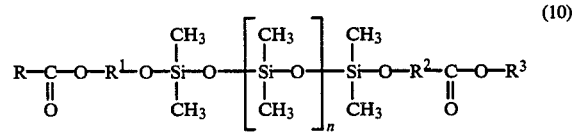

(10)

wherein each of R, $R^1$ and $R^2$ represents a hydrocarbon group having 1 to 21 carbon atoms, and n is an integer of 0 to 1,000; and Modified silicon compound disclosed in Japanese Patent Publication No. 57-12420 having the formula (11):

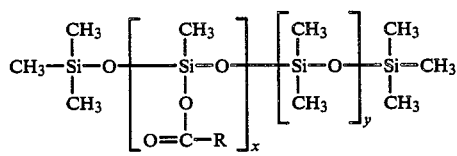

(11)

wherein R represents either a saturated or unsaturated hydrocarbon having 7 to 21 carbon atoms, and x and y have the relationship of $1<x<150$, $0<y$, $x+y<1,000$, $x/y=1/1000-1/1$.

The modified silicon compound used in the present invention can also be selected from those disclosed in Japanese Patent Publications No. 57-12417, No. 57-37724, No. 57-37725, No. 57-37726, No. 57-37727, No. 57-37728, No. 57-37729, No. 57-37730, No. 57-37731, No. 57-37732, No. 57-37733, No. 57-37734, No. 57-37735, No. 57-37736, No. 57-40748, No. 57-40749, No. 57-40750, No. 57-40751, No. 57-40752, No. 57-40753, No. 57-40754, No. 57-71521, No. 57-71522, No. 57-71523, No. 57-71524, No. 57-71527, No. 57-92427, No. 57-92428, No. 57-92429, No. 57-92430, No. 57-92431, No. 57-92432, No. 59-22227, No. 59-22228 and No. 59-22229.

The modifying agent employed to modify a silicon compound is not particularly restricted. The modifying agent can be selected from, for example, fatty acids, alcohols, amines and fluorohydrocarbons.

As the modified silicon compound which is used in the present invention, a fatty acid modified silicon compound is preferred, and especially the fatty acid-modified silicon compound having been modified by a fatty acid possessing 12 to 22 carbon atoms are preferred. Especially, the fatty acid-modified silicon compounds expressed by the above formulae (1), (2), (3), (4), (5), (9) (10) and (11) are preferred.

The amount of the modified silicon compound to be incorporated into the magnetic recording layer is not particularly limited, but the total amount of two kinds of modified silicon compounds is generally in the range of 0.5 to 10 parts by weight, more preferaby in the range of 1 to 5 parts by weight per each 100 parts by weight of the ferromagnetic powder. If the amount is less than 0.5 parts by weight, the electromagnetic characteristics and running property of the magnetic recording medium are not sufficiently improved in some cases. If the amount exceeds 10 parts by weight, the softening of the magnetic recording layer or the blooming of the modified silicon compounds may be caused, and the durability of the magnetic recording medium provided is weakened. The minimum amount of each modified silicon compound is preferably not less than 10 weight percent and more than 20 weight percent of the total amount of all modified silicon compounds used.

Other than the above-mentioned ferromagnetic powder, binder, and modified silicon compounds, the magnetic recording layer of the invention may include additives such as a dispersing agent, a lubricant, a stabilizer, an abrasive and an antistatic agent.

The dispersing agent employable in the invention are, for example, fatty acids having 12 to 22 carbon atoms (e.g., caprylic acid, capric acid, lauric acid, miristic acid, palmitic acid, stearic acid, oleic acid, elaidic acid, linoleic acid, linolenic acid, metallic soap of alkali metals (e.g., lithium, sodium, potassium) or alkali earth metals (e.g., magnesium, calcium, barium) of the above-mentioned fatty acids, fatty acid amides derived from the above-mentioned fatty acids, aliphatic amine, higher alcohols, polyalkylenoxide alkylphosphate ester, alkylphosphate ester, alkylborate ester, sarcosinates, alkyl ether esters, and other conventional dispersers such as trialkylpolyolefin quaternary ammonium salts and lecithin and surfactants.

The lubricants employable in the invention are, for example, the above-mentioned fatty acids, higher alcohols, fatty acid esters of monovalent fatty acids having 12 to 20 carbon atoms and mono/polyhydric alcohols having 3 to 20 carbon atoms (e.g., butyl stearate, solbitan oleate), mineral oils, animal or vegetable oils, olefin polymers having low molecular weight, α-olefin polymers having low molecular weight, conventional lubricants (e.g., graphite powder, molybdenum disulfide powder, teflon powder) and lubricants produced for plastics.

The abrasives employable in the invention are, for example, α-alumina, silicon carbide, chromium oxide, corundum, artificial corundum, diamond, artificial diamond, α-Fe$_2$O$_3$, garnet and emery (major components: corundum and magnetite). The average particle diameter of the abrasive is generally in the range of 0.01 to 2 μm and more preferably in the range of 0.1 to 1 μm.

The antistatic agents employable in the invention are, for example, carbon, natural surfactants (e.g., saponin), nonionic surfactants (e.g., those of alkylenoxide group, glycerols, glycidols), cationic surfactants (e.g., higher alkylamines, quarternary ammonium salts, heterocyclic phosphonium compounds such as pyridine or sulfonium compounds), anionic surfactant (e.g., carboxylic acid, sulfonic acid, phosphate and compounds having acid groups such as sulfuric ester groups and phosphoric ester groups), and amphoteric surfactants (e.g., amino acids, amino sulfonic acid, sulfuric or phosphoric esters of amino alcohols).

The magnetic recording medium of the present invention can be produced by the process comprising the steps of first by preparing a magnetic paint (or dispersion) containing the ferromagnetic powder, binder, modified silicon compounds and optional additives such as dispersing agent, lubricant, stabilizer, abrasive and antistatic agent in the conventional organic solvent such as methylethylketone cyclohexane, then applying this magnetic paint onto a nonmagnetic support upon which the magnetic paint is allowed to dry. Normally, a magnetic recording layer is formed by applying the magnetic paint directly on a nonmagnetic support, but it is also possible to provide an adhesive layer or a subbing layer between the magnetic paint layer and the nonmagnetic support.

The details of the ferromagnetic powder, additives, organic solvents and the method of dispersing have been disclosed in Japanese Patent Provisional Publications No. 52-108 (U.S. Pat. No. 4,135,016), No. 52-804, No. 54-21805 and No. 54-46011. The magnetic recording medium of the present invention can also be prepared by following the procedure reported in the above publications.

The examples and the comparison examples of the present invention are given below. In the following examples and comparison examples, the expression "parts" means "parts by weight" unless otherwise specified.

The modified silicon compounds which were used in the examples and the comparison examples are as follows:

Compound number [1-1], molecular weight 578

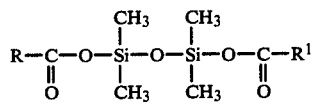

wherein R and R$^1$ each represents C$_{13}$H$_{27}$;

Compound number [1-2], molecular weight 1,278

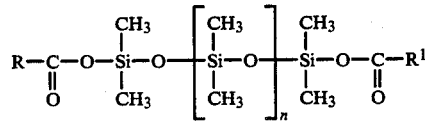

wherein each of R and R$^1$ represents C$_{13}$H$_{27}$, and n stands for 10;

Compound number [2-1], molecular weight 1,022

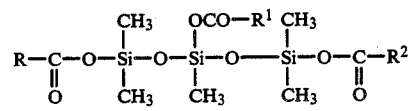

wherein each of R, R$^1$ and R$^2$ represents C$_{17}$H$_{33}$;

Compound number [2-2], molecular weight 5,446

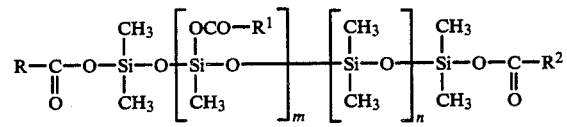

wherein each of R, R$^1$ and R$^2$ represents C$_{17}$H$_{33}$, m is 10, and n is 20;

Compound number [2-3], molecular weight 1,4336

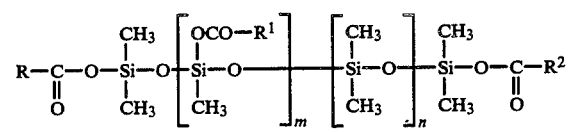

wherein each of R, R$^1$ and R$^2$ represents C$_{17}$H$_{33}$, m is 25, and n is 75;

Compound number [2-4], molecular weight 48,286

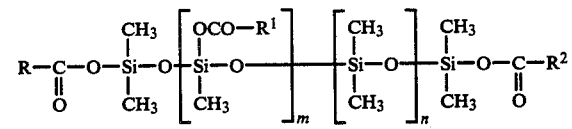

wherein each of R, R$^1$ and R$^2$ represents C$_{17}$H$_{33}$, m is 100, and n is 200;

Compound number [3-1], molecular weight 802

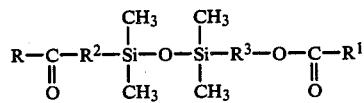

wherein each of R and R$^1$ represents C$_4$H$_9$, and each of R$^2$ and R$^3$ represents C$_{17}$H$_{33}$;

Compound number [4-1], molecular weight 616

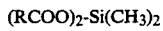
(RCOO)₂-Si(CH₃)₂ wherein R represents $C_{17}H_{33}$;
Compound number [5-1], molecular weight 780

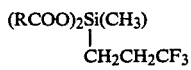
(RCOO)₂Si(CH₃)
          |
          CH₂CH₂CF₃ wherein R represents $C_{17}H_{33}$;
Compound number [6-1], molecular weight 1,637

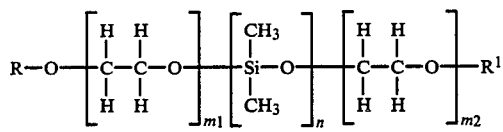

wherein each of R and $R^1$ represents $C_{18}H_{37}$, n is 12, and $m_1$ and $m_2$ are both 6;
Compound number [7-1], molecular weight 1,924

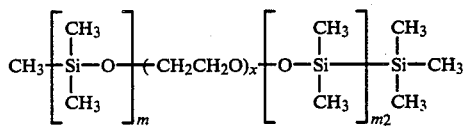

wherein each of m, $m_2$ and x stands for 10,
Compound number [9-1], molecular weight 1,092

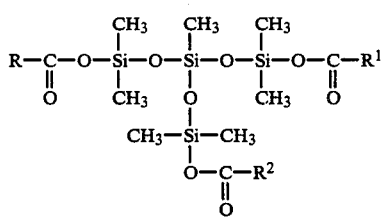

wherein each of R, $R^1$ and $R^2$ represents $C_{17}H_{33}$;
Compound number [9-2], molecular weight 16,023

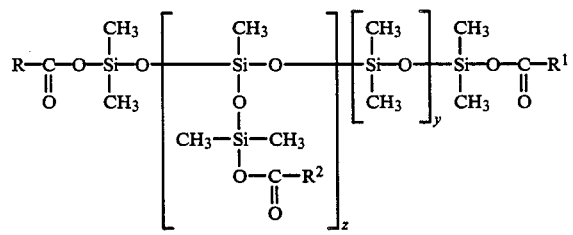

wherein each of R, $R^1$ and $R^2$ represents $C_{17}H_{33}$, y is 75, and z is 25;
Compound number [10-2], molecular weight 834

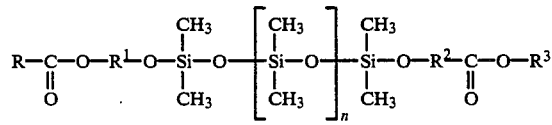

wherein each of R and $R^3$ represents $C_4H_9$, and each of $R^1$ and $R^2$ represents $C_{17}H_{34}$;
Compound number [11-1], molecular weight 13,804

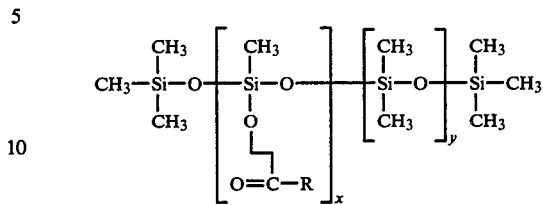

wherein R represents $C_{17}H_{33}$, x is 25, and y is 75.

The compounds and their molecular weights given above are the major components and molecular weights of the modified silicon compounds.

EXAMPLES 1–8

A magnetic paint was prepared by the process comprising the steps of dispersely mixing the components indicated below to yield a paste for 3 minutes using a sand grinder using the batch process, and filtering the resultant mixture using a filter having an average pore diameter of 1 μm.

| | |
|---|---|
| γ-Fe₂O₃ (Hc: 390 Oe, average particle length: 0.3 μm, specific surface area: 25 m²/g) | 100 parts |
| Vinyl chloride/vinyl acetate/vinyl alcohol copolymer (copolymerization ratio = 92:3:5, degree of polymerization: 400) | 20 parts |
| Polyester polyurethane (molecular weight: about 50,000) | 5 parts |
| Conductive carbon (particle size: 10 mμ) | 1 part |
| Methyl ethyl ketone | 150 parts |
| Cyclohexanone | 50 parts |
| Compound number [1-1], [2-3] | indicated in Table 1 |

The magnetic paint was coated on a polyethylene terephthalate film having thickness of 7 μm (the shrinkage ratio is 1.0%, and Ra is 0.02 μm upon storing at 110° C. for 4 hours), so that the resultant layer after drying would have thickness of 5 μm. While the layer was wet, the layer was treated with an electromagnet of 1,000 gauss to impart a magnetic orientation. After drying, the magnetic recording layer was subjected to supercalendering in order to make the surface of the layer smooth. The produced sheet was then slitted into a tape having width of 3.81 mm and incorporated in a heat-resisting half. Thus, a Phillips compact cassette tape was provided.

Each magnetic recording layer of a cassette tape prepared in Examples 1 to 4 included an equal amount of each of the modified silicon compound of Compound number [1-1] and molecular weight of 578 and the modified silicon compound of Compound number [2-3] and molecular weight of 14436. The total amount of the modified silicon compounds was different in the examples. Each magnetic recording layer of the cassette tape prepared in Examples 5 to 8 included an equal total amount of the modified silicon compound of Compound number [1-1] and of [2-3], 4 parts by weight for each 100 parts by weight of the ferromagnetic powder. The ratio between the two kinds of modified silicon compounds in the layer was different in examples.

The cassette tapes provided showed the output levels (M315) at 315 Hz and 3% distortion, saturated output levels (S10K) at 10 KHz, tape running properties, stain and creaking set forth in Table 1. Also set forth in Table 1 in parenthesis are the tape running properties, stain and creaking of cassette tapes after the tapes were played under a tension of 40 g/cm and stored at 110° C. for 4 hours. Set forth also in Table 1 are the heat shrinkage ratios in percentage along the longitudinal direction of a tape under the above-mentioned conditions.

COMPARISON EXAMPLES 1-3

COMPARISON EXAMPLE 1

A cassette tape was produced following essentially the same procedure of Example 1 except that the modified silicon compounds were not included.

COMPARISON EXAMPLE 2

A cassette tape was produced following essentially the same procedure of Example 1 except that 4 parts by weight of the modified silicon compound of Compound number [1-1] alone was used for each 100 parts by weight of the ferromagnetic powder.

COMPARISON EXAMPLE 3

A cassette tape was produced following essentially the same procedure of Example 1 except that 4 parts by weight of the modified silicon compound of compound number [2-3] alone was used for each 100 parts by weight of the ferromagnetic powder.

The cassette tapes provided showed the output levels (M315) at 315 Hz and 3% distortion, saturated output levels (S10K) at 10 KHz, tape running properties, stain and creaking set forth in Table 1. Also set forth in Table 1 in parenthesis are the tape running properties, stain and creaking of cassette tapes after the tapes were played under the tension of 40 g/cm and stored at 110° C. for 4 hours. Set forth also in Table 1 are the heat shrinkage ratios in percentage along the longitudinal direction of a tape under the above-mentioned conditions.

The tape running properties were evaluated by the running test using 50 commercial cassette players under the conditions of 60% RH at 25° C. and also by the running test using 100 commercial cassette players under the conditions of 80% RH at 100° C. The results of the evaluation are classified into the following.

A: running stops at not more than 1 roll, no disorder in winding is found;

B: running stops at not more than 1 roll, disorder in winding is found;

C: running stops at 2 to 3 rolls, disorder in winding is found;

D: running stops at 4 to 5 rolls, disorder in winding is found; and

E: running stops at above 6 rolls, disorder in winding is found.

After the running tests, the stain on the magnetic head of the cassette deck was observed. The results are classified into the following.

A: practically no stain is noted;

B: a little stain causing no trouble is noted;

C: some stain is noted;

D: much stain is noted; and

E: excessive stain is noted;

The creaky sounds observed during the tape running are classified into the following.

The number of rolls at which the creaky sound is observed is as follows:

A: none, B: 1 roll, C: 2 to 3 rolls, D: 4 to 5 rolls, and E: above 6 rolls.

EXAMPLES 9-12

Cassette tapes were produced following essentially the same procedure of Examples 1 to 8 except that the kinds and amount of the modified silicon compounds added were changed as indicated below.

The cassette tapes provided showed the output levels (M315) at 315 Hz at 3% distortion, saturated output levels (S10K) at 10 KHz, tape running properties, stain and creaking set forth in Table 2. Also set forth in Table 2 in parenthesis are the tape running properties, stain and creaking of cassette tapes after the tapes were played under the tension of 40 g/cm and stored at 110° C. for 4 hours. Set forth also in Table 2 are the heat shrinkage ratios in percentage along the longitudinal direction of a tape under the above-mentioned conditions.

TABLE 1

| | [1-1] part | [2-3] part | M315 (dB) | S10K (dB) | tape running property | stain | creak sound | heat shrinkage ratio (%) |
|---|---|---|---|---|---|---|---|---|
| Example | | | | | | | | |
| 1 | 0.5 | 0.5 | 0.2 | 0.9 | A(A) | A(A) | A(A) | 0.4 |
| 2 | 1.0 | 1.0 | 0.5 | 1.5 | A(A) | A(A) | A(A) | 0.4 |
| 3 | 2.0 | 2.0 | 0.8 | 1.8 | A(A) | A(A) | A(A) | 0.3 |
| 4 | 3.0 | 3.0 | 0.8 | 2.0 | A(A) | B(B) | A(B) | 0.3 |
| 5 | 0.5 | 3.5 | 0.5 | 1.6 | A(A) | A(A) | A(A) | 0.3 |
| 6 | 1.0 | 3.0 | 0.8 | 1.8 | A(A) | A(A) | A(A) | 0.3 |
| 7 | 3.0 | 1.0 | 0.8 | 1.5 | A(A) | A(A) | A(A) | 0.3 |
| 8 | 3.5 | 0.5 | 0.6 | 1.1 | A(A) | A(A) | A(A) | 0.4 |
| Comparison Example | | | | | | | | |
| 1 | — | — | −3.0 | −0.6 | E(E) | B(C) | E(E) | 0.9 |
| 2 | 4.0 | — | 0.4 | 0.3 | A(C) | A(A) | A(A) | 0.3 |
| 3 | — | 4.0 | −0.5 | 0.9 | B(B) | A(A) | A(B) | 0.4 |

Notes: The values listed for M315 (output levels at 3% distortion ratio at 315 Hz) and S10K (saturated output levels at 10KHz) are relative values based on the output level of FRI-C-60 (the product of Fuji Photo Film Co., Ltd.,) taken as 0 dB (measuring device: ZX-9 produced by Nakamichi Co., Ltd.).

| Example 9: | Compound No. | [1-1], [2-4] | 2 parts each |
| Example 10: | | [1-2], [2-3] | 2 parts each |
| Example 11: | | [2-1], [2-3] | 2 parts each |
| Example 12: | | [3-1], [2-3] | 2 parts each |
| Example 13: | | [4-1], [2-3] | 2 parts each |
| Example 14: | | [5-1], [2-3] | 2 parts each |
| Example 15: | | [6-1], [2-3] | 2 parts each |
| Example 16: | | [7-1], [2-3] | 2 parts each |
| Example 17: | | [9-1], [2-3] | 2 parts each |

-continued

| | | |
|---|---|---|
| Example 18: | [1-1], [2-3] | 2 parts each |
| Example 19: | [1-1], [2-3], [3-1] | 1 part each |
| Example 20: | [4-1], [6-1], [8-2] | 1 part each |

TABLE 2

| | M315 (dB) | S10K (dB) | tape running property | stain | creak sound | heat shrinkage ratio (%) |
|---|---|---|---|---|---|---|
| Example | | | | | | |
| 9 | 0.7 | 1.4 | A(A) | A(A) | A(A) | 0.3 |
| 10 | 0.8 | 1.5 | A(A) | A(A) | A(A) | 0.3 |
| 11 | 0.6 | 1.3 | A(A) | A(A) | A(A) | 0.3 |
| 12 | 0.7 | 1.3 | A(A) | A(A) | A(A) | 0.3 |
| 13 | 0.6 | 1.4 | A(A) | A(A) | A(A) | 0.3 |
| 14 | 0.6 | 1.6 | A(A) | A(A) | A(A) | 0.3 |
| 15 | 0.5 | 1.2 | A(A) | B(B) | A(A) | 0.3 |
| 16 | 0.4 | 1.1 | A(A) | B(B) | A(A) | 0.3 |
| 17 | 0.6 | 1.6 | A(A) | A(A) | A(A) | 0.3 |
| 18 | 0.7 | 1.5 | A(A) | A(A) | A(A) | 0.3 |
| 19 | 0.6 | 1.4 | A(A) | A(A) | A(A) | 0.3 |
| 20 | 0.6 | 1.3 | A(A) | A(A) | A(A) | 0.3 |

Note: Tests and evaluations were performed in the same manner as the one for Table 1, and the same legends as in Table 1 were used.

COMPARISON EXAMPLES 4–18

Cassette tapes were produced following essentially the same procedure of Example 1 except that the kinds of modified silicon compounds (or fatty acids) were changed to those indicated below and their amounts were 4 parts.

The cassette tapes showed the output levels (M315) at 315 Hz at 3% distortion, saturated output levels (S10K) at 10 KHz, tape running properties, stain and creaking set forth in Table 3. Also set forth in Table 3 in parenthesis are the tape running properties, stain and creaking of cassette tapes after the tapes were played under the tension of 40 g/cm and stored at 110° C. for 4 hours. Set forth also in Table 3 are the heat shrinkage ratios in percentage along the longitudinal direction of the tape under the above-mentioned conditions.

The comparison examples including modified silicon compounds having low molecuar weight alone are: Comparison Example 4: Compound number [1-1], Comparison Example 5: Compound number [1-2], Comparison Example 6: Compound number [3-1], Comparison Example 7: Compound number [5-1], Comparison Example 8: Compound number [5-1], Comparison Example 9: Compound number [6-1], Comparison Example 10: Compound number [7-1], Comparison Example 11: Compound number [9-1], and Comparison Example 12: Compound number [10-1].

The comparison examples including modified silicon compounds having high molecular weight alone are: Comparison Example 13: Compound number [2-2], Comparison Example 14: Compound number [2-4], Comparison Example 15: Compound number [9-2], and Comparison Example 16: Compound number [11-1].

The comparison examples including fatty acids are: Comparison Example 17: myristic acid and Comparison Example 18: oleic acid.

TABLE 3

| | M315 (dB) | S10K (dB) | tape running property | stain | creak sound | heat shrinkage ratio (%) |
|---|---|---|---|---|---|---|
| Comparison Example | | | | | | |
| 4 | 0.3 | 0.4 | A(C) | A(A) | A(B) | 0.5 |
| 5 | 0.4 | 0.3 | A(C) | A(A) | A(B) | 0.5 |
| 6 | 0.2 | 0.3 | B(C) | A(A) | B(B) | 0.5 |
| 7 | 0.3 | 0.3 | B(C) | A(A) | B(C) | 0.5 |
| 8 | 0.2 | 0.4 | A(D) | B(B) | B(B) | 0.6 |
| 9 | 0.1 | 0.3 | B(C) | B(B) | B(C) | 0.6 |
| 10 | −0.4 | 0.2 | B(B) | B(B) | B(B) | 0.5 |
| 11 | 0.2 | 0.4 | A(B) | A(A) | A(B) | 0.5 |
| 12 | 0.3 | 0.2 | B(C) | A(A) | B(C) | 0.5 |
| 13 | −0.4 | 0.7 | B(C) | A(A) | A(B) | 0.4 |
| 14 | −0.6 | 0.8 | B(B) | A(A) | A(B) | 0.4 |
| 15 | −0.6 | 0.7 | B(B) | A(A) | A(B) | 0.4 |
| 16 | −0.7 | 0.7 | B(B) | A(A) | A(B) | 0.4 |
| 17 | 0.6 | 0.2 | A(E) | A(B) | B(D) | 0.7 |
| 18 | 0.7 | 0.3 | A(E) | A(B) | B(D) | 0.8 |

Note: Tests and evaluations were performed in the same manner as the one for Table 1, and the same legends as in Table 1 were used.

The output level (M315) at 315 Hz at the distortion ratio of 3% and the saturated output level (S10K) at 10 KHz listed in Table 1 indicate the improved electromagnetic conversion characteristics of the recording tape according to the present invention. The electromagnetic conversion characteristics of the present invention are better than those of the recording tape containing no modified silicon compounds (Comparison Example 1) and better than those of a recording tape having only one modified compound of either low or high molecular weight (Comparison Example 1 and 2). The comparison of the output levels of the comparison examples set forth in Table 2 and the output levels of the comparison examples set forth in Table 3 further evidence that the magnetic recording medium of the present invention possesses electromagnetic conversion characteristics superior to those of a magnetic recording medium having one modified compound either of low or high molecular weight.

Tables 1 to 3 also indicate that the recording media of the present invention containing modified silicon compounds of both low and high molecular weight exhibit improved properties in tape running properties, stain, adhesion and creaky sound with the tape running. The properties of the tape according to present invention are examined after storing at 110° C. for 4 hours. A deterioration was hardly observed, and the heat shrinkage ratio along the longitudinal direction was determined to show a low value, less than 4%, showing a satisfactory heat resistivity of the present recording medium containing modified silicon compounds of both low and high molecular weight.

On the contrary to the above, Table 3 indicates that the recording media having a modified silicon compound of only low molecular weight tend to exhibit poor heat resistance, and the recording media containing only a modified silicon compound of high molecular weight tend to exhibit poor electromagnetic conversion characteristics. Also, the recording media containing a fatty acid tend to exhibit poor heat resistance.

In the magnetic recording medium of the invention, the blooming of modified silicon compounds does not occur, whereby the collection of stain on the recording medium is reduced, and the magnetic head is kept clean.

Figure 2:
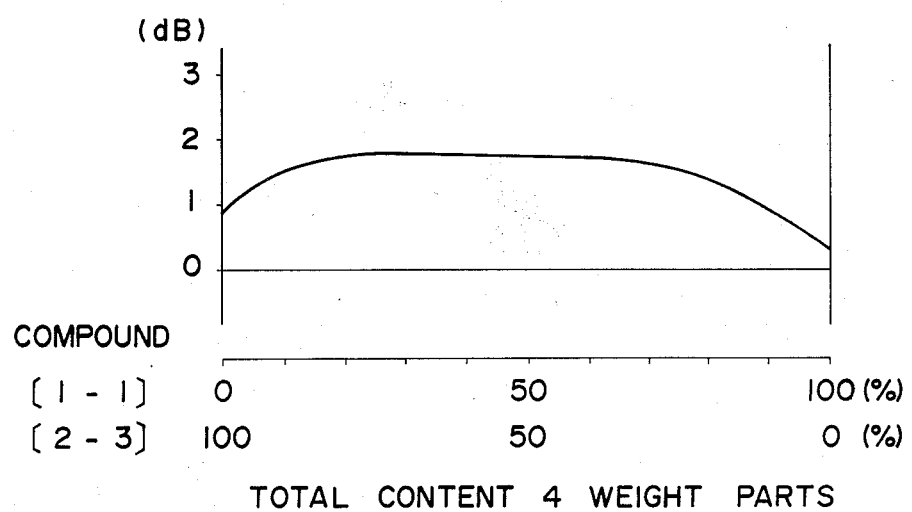
FIG. 2 is a graph showing an example of the characteristic of the saturated output level of the magnetic recording medium of the invention at 10 KHz.

The output levels (M315) at 315 Hz at the distortion ratio of 3% obtained in Examples 3, 5, 6, 7 and 8 and Comparison Examples 2 and 3 are indicated in FIG. 1. The saturated output levels at 10 KHz obtained also in the above are indicated in FIG. 2. From these figures, it has been confirmed that the magnetic conversion characteristics are improved by including 10 weight percentage or preferably 20 weight percentage of one of two kinds of modified silicon compounds in a magnetic recording layer in the case where two kinds of modified silicon compounds are used.

EXAMPLES 21–28

The components indicated below were mixed dispersely to yield a paste for 3 minutes by using a sand grinder using the batch process.

| | |
|---|---|
| Co-coated bertholide iron oxide (Co 3.0 atom % coated $FeO_{1.4}$, Hc: 390 Oe, surface area per weight: 32 $m^2/g$) | 100 parts |
| Vinyl chloride/vinyl acetate/maleic acid anhydride copolymer (copolymerization ratio = 86:13:1, degree of polymerization: 400) | 20 parts |
| Polyester polyurethane (molecular weight: about 50,000) | 5 parts |
| Butyl stearate | 2 parts |
| Conductive carbon (particle size 10 mμ) | 1 part |
| α-Almina (particle size: 0.4 μm) | 2 parts |
| Methyl ethyl ketone | 150 parts |
| Cyclohexanone | 50 parts |
| Compound number [1-1], [2-3] | indicated in Table 5 |

After the above components were dispersely mixed, to the resultant mixture was added 10 parts of Desmodur L-75 (the product of Sumitomo Bayer Co., Ltd.) and further mixed for 10 minutes and then filtered on a filter having an average pore diameter of 1 μm to yield a magnetic paint.

The magnetic paint was coated on a polyethylene terephthalate film having a thickness of 15 μm (the heat shrinkage ratio is 0.3% and Ra is 0.002 μm after storing at 70° C. for 48 hours), so that the resultant layer after being dried would have the thickness of 5 μm. While the layer was wet, the layer was treated with an electromagnet of 2,000 gauss to give a magnetic orientation. After drying, the magnetic recording layer was subjected to supercalendering in order to make the surface of the layer smooth. The sheet obtained was then slitted into a video tape (VHS type) having the width of ½ inch.

Each magnetic recording layer of a video tape prepared in Examples 21 to 24 includes an equal amount of each of the modified silicon compounds of Compound number [1-1] and molecular weight of 578 and the modified silicon compound of Compound number [2-3] and molecular weight of 14336. The total amount of the modified silicon compounds was different in the examples. Each magnetic recording layer of a video tape prepared in Examples 25 to 28 contains the equal total amount of the modified silicon compound of Compound number [1-1] and [2-3], 4 parts by weight for each 100 parts by weight of the ferromagnetic powder. The ratio of two kinds of modified silicon compounds in the layer was different in the examples.

The video tapes showed the video outputs, S/N ratios and still characteristics set forth in Table 4.

Also set forth in Table 5 are the jitter and skew under the conditions of: Condition 1: at room temperature, Condition 2: at 40° C. and at 80% RH, Condition 3: after storing 48 hours at 70° C.

COMPARISON EXAMPLES 19–23

COMPARISON EXAMPLE 19

A video tape was produced following essentially the same procedure of Example 21 except that the modified silicon compounds were not included.

COMPARISON EXAMPLE 20

A video tape was produced following essentially the same procedure of Example 21 except that 4 parts by weight of the modified silicon compound of Compound number [1-1] alone was used for each 100 parts by weight of the ferromagnetic powder.

COMPARISON EXAMPLE 21

A video tape was produced following essentially the same procedure of Example 21 except that 4 parts by weight of the modified silicon compound of Compound number [2-3] was used for each 100 parts of the ferromagnetic powder.

COMPARISON EXAMPLE 22

A video tape was produced following essentially the same procedure of Example 21 except that myristic acid was used instead of the modified silicon compound.

COMPARISON EXAMPLE 23

A video tape was produced following essentially the same procedure of Example 21 except that oleic acid was used instead of the modified silicon compound.

The video tapes showed the video outputs, S/N ratios and still characteristics set forth in Table 4.

Also set forth in Table 5 are the jitter and skew under the conditions of: Condition 1: at room temperature, Condition 2: at 40° C. and 80% RH, Condition 3: after storing 48 hours at 70° C.

TABLE 4

| No. | [1-1] part | [2-3] part | video output (dB) | S/N ratio (dB) | still (minute) |
|---|---|---|---|---|---|
| Example | | | | | |
| 21 | 0.5 | 0.5 | 0.3 | 0.4 | 120 |
| 22 | 1.0 | 1.0 | 0.7 | 0.6 | 120 |
| 23 | 2.0 | 2.0 | 1.0 | 1.0 | 120 |
| 24 | 3.0 | 3.0 | 1.2 | 1.0 | 120 |
| 25 | 0.5 | 3.5 | 0.5 | 0.6 | 120 |
| 26 | 1.0 | 3.0 | 0.8 | 0.9 | 120 |
| 27 | 3.0 | 1.0 | 1.0 | 0.9 | 120 |
| 28 | 3.5 | 0.5 | 1.0 | 0.7 | 120 |
| Comparison Example | | | | | |
| 19 | — | — | −2.5 | −3.6 | 40 |
| 20 | 4.0 | — | 0.7 | 0.4 | 80 |
| 21 | — | 4.0 | −0.2 | −0.1 | 90 |
| 22 | myristic acid | | 0.0 | 0.0 | 90 |
| 23 | oleic acid | | 0.0 | 0.1 | 80 |

TABLE 5

| No. | jitter (μsec) | | | skew (μsec) | | |
|---|---|---|---|---|---|---|
| | (1) | (2) | (3) | (1) | (2) | (3) |
| Example | | | | | | |
| 21 | 0.06 | 0.08 | 0.08 | 10 | 12 | 11 |
| 22 | 0.05 | 0.06 | 0.06 | 8 | 10 | 9 |
| 23 | 0.05 | 0.06 | 0.05 | 7 | 9 | 7 |
| 24 | 0.06 | 0.07 | 0.06 | 6 | 8 | 6 |
| 25 | 0.05 | 0.06 | 0.06 | 5 | 7 | 6 |
| 26 | 0.04 | 0.05 | 0.06 | 5 | 8 | 6 |
| 27 | 0.05 | 0.06 | 0.06 | 4 | 9 | 8 |

TABLE 5-continued

| No. | jitter (μsec) | | | skew (μsec) | | |
|---|---|---|---|---|---|---|
| | (1) | (2) | (3) | (1) | (2) | (3) |
| 28 | 0.06 | 0.08 | 0.09 | 8 | 9 | 11 |
| Comparison Example | | | | | | |
| 19 | 0.49 | -not measureable | above 35 | not measurable | | |
| 20 | 0.10 | 0.10 | 0.15 | 12 | 15 | 15 |
| 21 | 0.08 | 0.08 | 0.12 | 10 | 11 | 13 |
| 22 | 0.11 | 0.11 | 0.36 | 15 | 27 | 28 |
| 23 | 0.12 | 0.12 | 0.41 | 16 | 22 | 29 |

Note: The values listed in Table 4 are relative values based on the video output of Super HG-T-120 (the product of Fuji Photo Film Co., Ltd.) taken as 0dB.

The values for S/N ratio are relative values based on S/N ratio at 10 KHz-4 MHz of Super HG-T-120 (the product of Fuji Photo Film Co., Ltd.), which was obtained upon correcting visual sensitivity, taken as 0dB.

As for the evaluation of still, the time required at still mode until the screen image was prominently disordered was included.

The above-mentioned video outputs, s/N ratios and still were measured by NV-8750 (the product of Matsushita Electric Co., Ltd.).

Jitter set forth in Table 5 were frequency changes at 15750 Hz measured by Jitter Display (the product of Japan Victor Co., Ltd.) and NV-8750 (the product of Matsushita electric Co., Ltd.).

Skew was measured by TG5-12U (the product of Shiba Den Co., Ltd.) and NV-8750 (Matsushita Electric Co., Ltd.).

Jitter and skew were measured by reproducing an information recorded in the tape kept at 25° C. under the humidity of 60% RH.

EXAMPLES 29-38

A cassette tape was produced following essentially the same procedure of Example 21 except that Co-coated bertholide iron oxide was replace by an alloy powder containing Fe as a major component (Fe:Ni:Zn=93:5:2, Hc 1,300 Oe, relative surface area: 40 m²/g), and the kind and amount of modified silicon compounds were changed as follows.

| | |
|---|---|
| Example 29: | Compound No. [1-1], [2-3] 2 parts each |
| Example 30: | Compound No. [1-2], [2-3] 2 parts each |
| Example 31: | Compound No. [2-1], [2-3] 2 parts each |
| Example 32: | Compound No. [3-1], [2-3] 2 parts each |
| Example 33: | Compound No. [4-1], [2-3] 2 parts each |
| Example 34: | Compound No. [5-1], [2-3] 2 parts each |
| Example 35: | Compound No. [6-1], [2-3] 2 parts each |
| Example 36: | Compound No. [7-1], [2-3] 2 parts each |
| Example 37: | Compound No. [19-1], [2-3] 2 parts each |
| Example 38: | Compound No. [1-1], [8-2] 2 parts each |

The video tapes showed the video output, S/N ratios and still characteristics set forth in Table 6.

Also set forth in Table 7 are the jitter and skew under the conditions of: Condition 1: at room temperature, Condition 2: at 40° C. at 80% RH, Condition 3: after storing 48 hours at 70° C.

COMPARISON EXAMPLES 24-28

COMPARISON EXAMPLE 24

A video tape was produced following essentially the same procedure of Example 21 except that Co-coated bertholide iron oxide was replace by an alloy powder having Fe as a major component (Fe:Ni:Zn=93:5:2, Hc 1,300 Oe, specific surface area 40 m²/g), and the modified silicon compounds were not used.

COMPARISON EXAMPLE 25

A video tape was produced following essentially the same procedure of Example 21 except that the above-mentioned alloy powder having Fe as a major component was used instead of the Co-coated bertholide iron oxide, and 4 parts by weight of the modified silicon compound of Compound number [1-1] was used alone.

COMPARISON EXAMPLE 26

A video tape was produced following essentially the same procedure of Example 21 except the above-mentioned alloy powder having Fe as a major component was used instead of the Co-coated bertholide iron oxide, and 4 parts by weight of the modified silicon compound of Compound number [2-3] was used alone.

COMPARISON EXAMPLES 27 & 28

A video tape was produced following essentially the same procedure of Example 21 except the above-mentioned alloy powder having Fe as a major component was used instead of the Co-coated bertholide iron oxide, and instead of the modified silicon compound, myristic acid was used for Comparison Example 27 and oleic acid was used for Comparison Example 28.

The video tapes showed the video output, S/N ratios and still characteristics set forth in Table 6.

Also set forth in Table 7 are the jitter and skew under the conditions of: Condition 1: at room temperature, Condition 2: at 40° C. at 80% RH, Condition 3: after storing 48 hours at 70° C.

TABLE 6

| No. | video output (dB) | S/N ratio (dB) | still (minute) |
|---|---|---|---|
| Example | | | |
| 29 | 5.6 | 3.7 | 60 |
| 30 | 5.8 | 3.8 | 60 |
| 31 | 5.7 | 3.9 | 60 |
| 32 | 5.5 | 3.5 | 60 |
| 33 | 5.8 | 3.8 | 50 |
| 34 | 5.7 | 3.6 | 60 |
| 35 | 5.2 | 3.3 | 50 |
| 36 | 5.0 | 3.0 | 40 |
| 37 | 5.7 | 3.8 | 60 |
| 38 | 5.7 | 3.8 | 50 |
| Comparison Example | | | |
| 24 | −0.3 | −2.6 | 2 |
| 25 | 4.6 | 2.8 | 40 |
| 26 | 4.1 | 2.3 | 30 |
| 27 | 4.5 | 3.0 | 20 |
| 28 | 5.0 | 2.9 | 10 |

TABLE 7

| | jitter (μsec) | | | skew (μsec) | | |
|---|---|---|---|---|---|---|
| | (1) | (2) | (3) | (1) | (2) | (3) |
| Example | | | | | | |
| 29 | 0.06 | 0.08 | 0.07 | 9 | 12 | 10 |
| 30 | 0.07 | 0.09 | 0.08 | 10 | 13 | 11 |
| 31 | 0.08 | 0.10 | 0.08 | 9 | 13 | 10 |
| 32 | 0.07 | 0.09 | 0.07 | 10 | 12 | 12 |
| 33 | 0.08 | 0.08 | 0.07 | 9 | 11 | 10 |
| 34 | 0.07 | 0.07 | 0.07 | 8 | 12 | 9 |
| 35 | 0.09 | 0.08 | 0.09 | 12 | 14 | 13 |
| 36 | 0.09 | 0.08 | 0.09 | 13 | 15 | 14 |
| 37 | 0.07 | 0.09 | 0.08 | 9 | 12 | 10 |
| 38 | 0.07 | 0.08 | 0.07 | 8 | 11 | 10 |
| Comparison Example | | | | | | |

TABLE 7-continued

|    | jitter (μsec) | | | skew (μsec) | | |
| --- | --- | --- | --- | --- | --- | --- |
|    | (1) | (2) | (3) | (1) | (2) | (3) |
| 24 | 0.82 | not measurable | | above 35 | not measurable | |
| 25 | 0.13 | 0.15 | 0.17 | 15 | 17 | 17 |
| 26 | 0.11 | 0.13 | 0.11 | 12 | 15 | 14 |
| 27 | 0.18 | 0.23 | 0.39 | 20 | 26 | 34 |
| 28 | 0.20 | 0.25 | 0.45 | 21 | 29 | 35 |

Note: Tests and evaluations were performed in the same manner as the one for Table 4 and 5, and the same representations as in Table 4 and 5 were used.

The video outputs and S/N ratios set forth in Table 4 and Table 6 clearly indicate the improved electromagnetic conversion characteristics of the magnetic recording media of the present invention. The comparison of examples and comparison examples further evidences that the magnetic recording medium of the present invention containing the modified silicon compounds of both low and high molecular weight processes excellent electromagnetic conversion characteristics. Also the long running period at still mode indicates satisfactory durability of the magnetic recording medium according to the present invention.

On the other hand, small values set forth in Table 5 and Table 7 under the conditions (1), (2) and (3) for the jitter and skew of the recording media of the present invention indicate satisfactory running properties under normal conditions, high temperature and high humidity and after storage at a high temperature. Therefore, it has been confirmed that the magnetic recording medium of the present invention is not affected by temperature or humidity and possesses an excellent heat resistance.

We claim:

1. In a magnetic recording medium comprising a nonmagnetic support and a magnetic recording layer provided on said support, said magnetic recording layer comprising a ferromagnetic powder dispersed in a binder, the improvement which comprises said magnetic recording layer containing at least one modified silicon compound having molecular weight in the range of 200–2000 and at least one modified silicon compound having molecular weight in the range of 5,000 to 100,000, the minimum amount of each modified silicon compound being not less than 10 weight percent based on the total amount of all modified silicon compounds used.

2. The magnetic recording medium as claimed in claim 1, wherein the minimum amount of each modified silicon compound is more than 20 weight percent based on the total amount of all modified silicon compounds used.

3. The magnetic recording medium as claimed in claim 1, wherein said modified silicon compounds are both fatty acid-modified silicon compounds.

4. The magnetic recording medium as claimed in claim 3, wherein said fatty acid-modified silicon compounds are silicon compounds modified by a fatty acid having 12 to 22 carbon atoms.

5. The magnetic recording medium as claimed in any one of claims 1, 3 or 2 wherein the total amount of said modified silicon compounds in the magnetic recording layer is in the range of 0.5 to 10 parts by weight per 100 parts by weight of the ferromagnetic powder.

6. The magnetic recording medium as claimed in each any one of claims 1, 3 or 2 wherein said nonmagnetic support has heat shrinkage ratio of not higher than 1.2% upon tensionless storage at 110° C. for 4 hours.

7. The magnetic recording medium as claimed in claim 6, wherein said nonmagnetic support has heat shrinkage ratio of not higher than 1.0% upon tensionless storage at 110° C. for 4 hours.

8. The magnetic recording medium as claimed in any one of claims 1, 3 or 2 wherein said nonmagnetic support is a nonmagnetic support for video tape having heat shrinkage ratio of not higher than 0.7% upon tensionless storage at 110° C. for 4 hours.

* * * * *